Nov. 25, 1924.
A. H. HUDDART
1,517,069
STRETCHER SUPPORT FOR AMBULANCE VEHICLES
Filed July 17, 1923        3 Sheets-Sheet 2
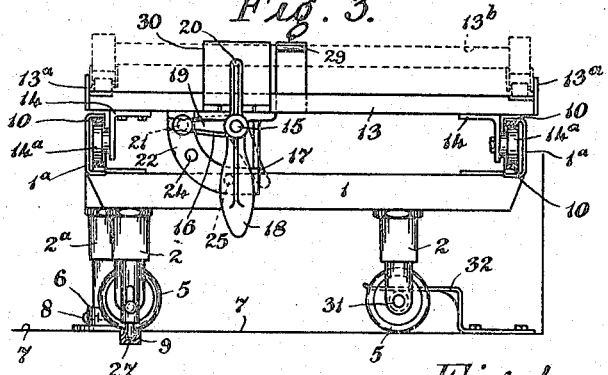
Fig. 3.
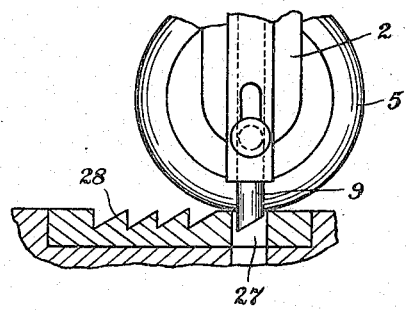
Fig. 5.
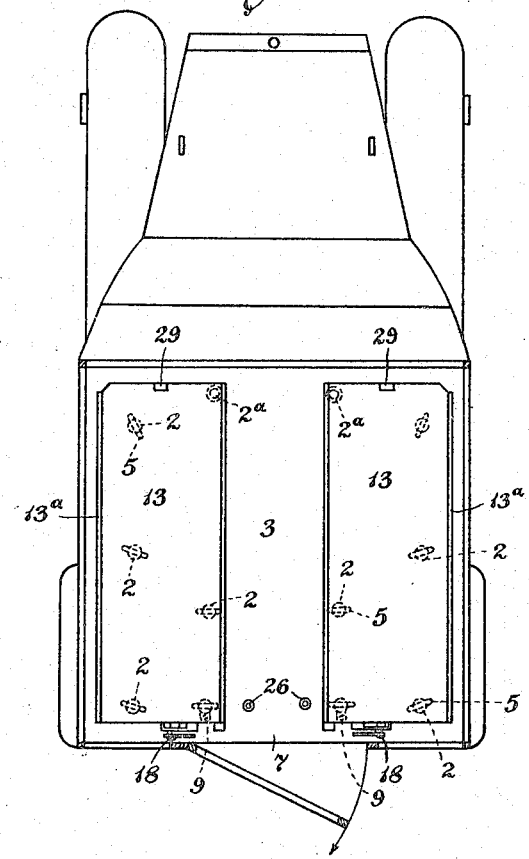
Fig. 4.
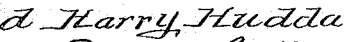
Inventor
Alfred Harry Huddart
By
Attorney Nov. 25, 1924.
A. H. HUDDART
1,517,069
STRETCHER SUPPORT FOR AMBULANCE VEHICLES
Filed July 17, 1923  3 Sheets-Sheet 3
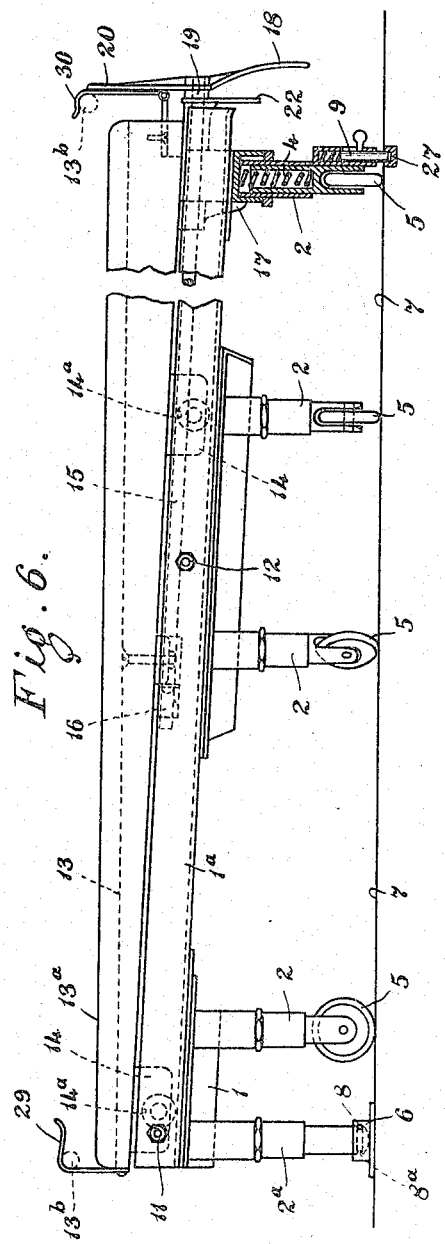
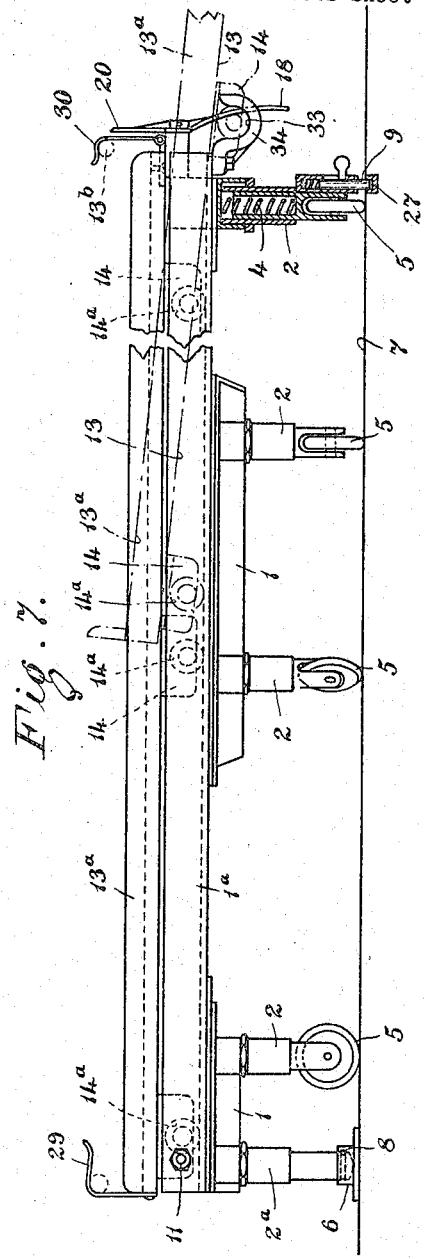
Inventor
Alfred Harry Huddart
By
Attorney Patented Nov. 25, 1924.

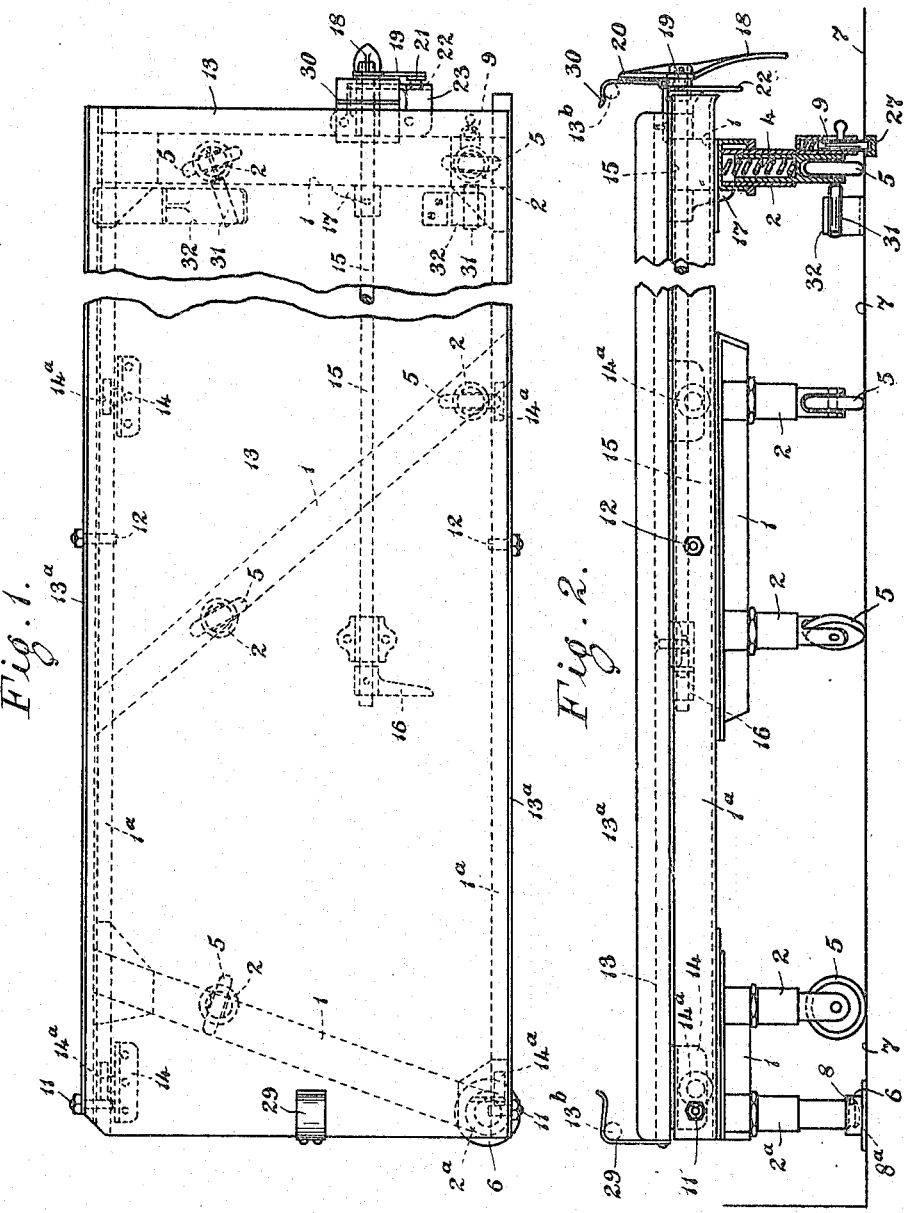

1,517,069

UNITED STATES PATENT OFFICE.

ALFRED HARRY HUDDART, OF GODALMING, ENGLAND.

STRETCHER SUPPORT FOR AMBULANCE VEHICLES.

Application filed July 17, 1923. Serial No. 652,185.

*To all whom it may concern:*

Be it known that ALFRED HARRY HUDDART, a subject of the King of Great Britain, residing at Godalming, Surrey, England, has invented certain new and useful Improvements in Stretcher Supports for Ambulance Vehicles, of which the following is a specification.

The object of this invention is to so construct the supports for stretchers in ambulance vehicles that said supports or frame can be moved to bring the end thereof which is adjacent to the door of the vehicle into alignment with the door opening so that a stretcher can be readily and quickly removed therefrom thus avoiding the necessity that a person be inside the vehicle to assist in removing the stretcher as is now generally the case.

The invention is designed particularly for use with that type of ambulance vehicle which has a door at the centre of the rear end of its body and which has a passageway between the stretcher supports, said supports being situated next to the sides of the body, but is applicable to other constructions of bodies.

My invention will be clearly understood from the following description aided by the annexed drawings in which—

Figure 1 is a plan of the support or frame.

Figure 2 is a side view of the support or frame.

Figure 3 is an end view of the support or frame, the stretcher being shown in dotted lines.

Figure 4 is a plan view of an ambulance vehicle having a pair of the stretcher supports or frames which form the subject-matter of the invention installed therein.

Figure 5 is a detail view of appliances to prevent a support or frame moving outwards should it not be fully pushed home.

Figure 6 is a side view of a support or frame in which the stretcher-carrying tray is provided with an inclined under surface which is positioned on an inclined top surface of the support for facilitating withdrawal of the tray and stretcher.

Figure 7 is a side view of a support wherein the support is shown as provided with hooks and the tray with pintles to engage said hooks so that, after the tray and stretcher have been withdrawn, say for half their length the pintles will engage the hooks in order that the tray and stretcher can be tilted to facilitate withdrawal of the stretcher.

I construct the support in the form of a skeleton frame 1 having four or more legs 2, one at each corner on the side thereof which is adjacent the passageway 3, the other legs being positioned as desired but so as to carry the frame and support the weight evenly and securely. In the drawings I have shown six such legs.

Each leg 2, see right hand side of Figure 2, may be constructed from two telescoping tubular members having a coiled spring 4 within them so that the weight is supported on springs, and all of said legs except one have rubber tyred wheels 5.

The leg $2^a$ at the forward corner of the frame adjacent the passageway 3 is temporarily held by a socket piece 6 fixed to the flooring 7 or otherwise so that said leg can revolve in the socket. The leg is held against removal from the socket 6 by a pin 8 passing through the socket piece 6 and engaging a groove $8^a$ in the end of the leg $2^a$.

The other legs 2 are so disposed that the wheels can each have a circular movement around the fixed leg $2^a$.

The leg 2 at the rear end of the frame adjacent the door of the vehicle is provided with a spring controlled or other bolt 9 for the purpose hereafter described.

The side members of the frame 1 are preferably in the form of channel irons $1^a$, $1^a$ of which the channels are in opposed relation, (see Fig. 3), the interiors of the flanges of said channels being lined with asbestos sheeting 10 or similar material and stops 11, 11 are provided at one end and other stops 12, 12 at about midway of the length of said channels.

A stretcher-carrying tray 13 is mounted to slide longitudinally upon said support, said tray having brackets 14 on its under side adjacent its longitudinal edges carrying wheels $14^a$, which ride in the channels of the channel-irons $1^a$ and have a movement between the stops 11 and 12, say for about half the length of the frame. The tray 13 supports a stretcher $13^b$ and, in order to hold the stretcher $13^b$ down upon the tray 13 during jolting of the vehicle, an upwardly projecting spring hook 29 is attached to the rear end of the tray and a similar spring hook 30 is hinged to the forward end of the tray, so that when a stretcher is placed upon the tray, the forward end bar of the stretcher is pushed under the spring hook 29, which grips it, whereupon the pivoted hook 30 is pushed over the opposite end bar of the stretcher.

A rock shaft 15 is carried by the underside of the tray 13 and extends from the rear end of the tray to a point approximately midway of the length of the tray. This rock shaft 15 carries two arms 16 and 17 arranged at a right angle to one another. The arms 16 and 17 are adapted, when turned downwardly, to engage one of the end members of the support or frame 1 and act as stops for the tray.

An operating handle 18 is carried by the rock shaft 15 and carries two arms 19 and 20, the arm 19 carrying a spring-pressed ball 21, which rides on a quadrant 22, depending from the end of the tray, and enters depressions 23, 24 and 25 in said quadrant when the handle 18 is turned to bring the arm 16 or the arm 17 on the shaft 15 into position to engage an end member of the support or frame 1. The arm 20, when turned upwardly, engages the hinged spring hook 30, to force the same over the end bar of the stretcher and hold said hook in such position.

In normal position the tray 13 lies fully on the frame 1 and the stretcher 13$^b$ rests upon the tray 13 which has a flange 13$^a$ on each side, and the tray 13 is secured against longitudinal movement on the frame by engagement of one arm 17 on the rock shaft 15 with the rear end member of the support 1.

Now to position a stretcher on the tray 13 or remove same from the tray, the bolt 9 of one of the rear legs of the tray, which has been in engagement with a socket 27 in the floor of the vehicle is lifted and the frame 1 and tray 13, the support is swung around on the pivoted leg 2$^a$ until the rear end of the support is opposite the door opening when the bolt may enter a hole 26 in the flooring, thus holding the frame 1 and tray 13 in such position.

The handle 18 is now turned to move the arm 20 from engagement with the pivoted spring hook 30 and the other arm 17 from engagement with an end member of the frame 1 and to position the arm 16 for engagement with said end member of the frame, the ball 21 entering the depression 24 in the quadrant 22 to lock the arms 16, 17. The tray 13 may then be pulled through the doorway until the brackets 14 engage with the stops 12. Now on further movement of the handle 18 the second arm 16 on the rock shaft 15 engages the front cross bar of the frame 1 and holds the tray 13 fixedly in position with the tray projecting well out of the doorway but prevented from tilting by engagement of its wheels 14$^a$ with the upper flanges of the channel irons 1$^a$. The stretcher 13$^b$ can then be removed from or applied to the tray 13 and, on a reverse movement of the handle 18, the arms 16, 17 will be returned to their normal positions and the tray 13 can be pushed back. On a further movement of the handle the tray will be locked to the frame as before.

The bolt 9 of the leg 2 may now be lifted and the frame 1, tray 13 and stretcher 13$^b$ may be swung back on the pivoted leg 2$^a$ to their normal position next to the side of the vehicle, at which time the bolt 9 of the leg 2 will enter the hole 27 in the flooring 7 and be held thereto and prevent any swinging movement of the support towards the passageway due to rocking of the vehicle whilst travelling. I may position in the floor a ratchet track 28 and form the bolt 9 with an inclined end so that the bolt 9 will ride over the ratchet track 28 and be held from swinging movement towards the passageway, as will be understood from Figure 5.

Instead of a stretcher seats may be mounted on the tray 13 so that the vehicle can be used for carrying persons not requiring a stretcher. In such case the seats are held to the frame between the side flanges and by the locking arms as in the case of a stretcher and are also held down by the spring hooks 29 and 30.

By placing the wheels on the legs of the frame to run in circles around the pivoted leg a very easy movement of the device is effected.

To prevent the frame from rising during travel of the vehicle I provide one or more of the legs 2 with a projecting pin 31 which engages under a clip 32 secured to the floor 7.

According to Figure 6 I form the frame 1 with an inclined upper side and similarly incline the upper side of the tray, so that the stretcher will always be level, and when the stretcher is drawn out, the front end of same will be at a lower level, thereby making it possible for a short person to hold the tray with greater ease; and, to obtain the same result with another construction, I may, as indicated in Figure 7, provide the tray with stub axles 33 which, when the tray and stretcher have been pulled out to their full extent can be positioned over hooks 34 on the frame so that, by a lowering of the front of the tray, the axles 33 will engage the hooks 34 and the tray and stretcher can be rocked about same so that the front of the tray and stretcher can be lowered to the desired height.

What I do claim as my invention and desire to secure by Letters Patent, is:—

1. A stretcher carrying appliance for ambulance vehicles, comprising a frame having a plurality of supporting legs, one of said legs having its lower end adapted to be revolubly connected to the floor of a vehicle and the other legs having their lower ends movable across such floor, means for locking the frame against movement on said revolvable leg, a stretcher carrying tray mounted to slide longitudinally upon said frame, stops carried by said frame for limiting the movement of said tray relatively to said frame, means carried by the tray for locking it in position either fully upon said frame or partially withdrawn therefrom, and means for securing a stretcher on said tray.

2. A stretcher carrying apparatus for ambulance vehicles comprising a frame, legs supporting said frame, one of said legs at one end of said frame being adapted for pivotal attachment with the floor of a vehicle, the other of said legs being provided with supporting rollers, and one of the latter legs having a latch for engagement with the floor of the vehicle for locking the frame against pivotal movement.

3. In a stretcher carrying appliance for ambulance vehicles, a frame having longitudinal channel irons forming guideways, a stretcher carrying tray mounted on said frame having rollers movable in said guideways, stops on said frame for limiting the movement of the rollers in said guideways, a rod extending longitudinally of the tray having arms adapted to engage with the frame, and means for turning said arms into and out of engagement with the frame.

4. A stretcher carrying appliance for ambulance vehicles, comprising a frame, legs supporting said frame, a clip for attachment to the floor of a vehicle, one of said legs having a pin extending laterally therefrom for engagement with said clip to hold the frame against displacement from the floor of the vehicle.

5. In a stretcher carrying appliance for ambulance vehicles, a frame, legs supporting said frame, a clip for attachment to the floor of a vehicle, a pin extending laterally from one of said legs for engagement with said clip to hold the frame against displacement from the floor of the vehicle, a tray movable longitudinally of said frame, means for securing said tray against movement on said frame, and spring clips carried by the tray for engagement with the frame of a stretcher.

6. In an ambulance vehicle having a door opening at its rear end, a stretcher carrying appliance comprising a plurality of supporting legs, one of said legs being located adjacent the forward end of the vehicle and connected to the floor of said vehicle, the ends of the other legs being movable across said floor, a frame supported by said legs and mounted to turn upon said first-named leg to permit its opposite end to be brought into alignment with said door opening, and a stretcher supporting tray mounted for longitudinal movement on said frame.

7. A stretcher carrying appliance for ambulance vehicles, comprising a supporting frame, a stretcher-carrying tray mounted for longitudinal movement on said frame, means carried by said tray and engageable with said supporting frame for locking said tray against movement when in normal position on said frame, means carried by said tray and engageable with said supporting frame for locking the tray against further movement when partially withdrawn from said supporting frame and means operable from one end of the tray for simultaneously moving one of said locking means into operative position and the other of said locking means into inoperative position.

8. A stretcher carrying appliance for vehicles, comprising a supporting frame, a stretcher-carrying tray mounted for longitudinal movement on said frame, means for securing a stretcher against removal from said tray including a device carried by said tray and shiftable into and out of engagement with said stretcher, means carried by said tray and shiftable into and out of position to lock said tray against movement on said frame, and means at one end of said frame for simultaneously securing said shiftable stretcher-engaging device into stretcher securing position and shifting said tray locking means into operative position.

9. A stretcher carrying appliance for vehicles, comprising a supporting frame, a stretcher-carrying tray mounted for longitudinal movement on said frame, said tray having means adjacent one of its ends movable into engagement with said frame for locking said tray against movement on said frame, said tray also having means intermediate its ends movable into engagement with said frame to limit the movement of said tray relatively to said frame when said first named means is released, means for securing a stretcher on said tray including a device carried by said tray and shiftable into and out of engagement with said stretcher, and means for simultaneously releasing said tray limiting means, moving said tray locking means into operative position and locking said shiftable means in engagement with a stretcher.

In testimony whereof I have hereunto set my hand in presence of two subscribing witnesses.

ALFRED HARRY HUDDART.

Witnesses:
JESSIE MORGAN,
LYNWOOD F. GARDNER.